United States Patent
Chen et al.

(12)

(10) Patent No.: US 12,209,872 B2
(45) Date of Patent: Jan. 28, 2025

(54) TRIP SIMULATOR FOR INCREASED TIME-EFFICIENCY WHEN CHARGING

(71) Applicant: TOYOTA RESEARCH INSTITUTE, INC., Los Altos, CA (US)

(72) Inventors: Francine Chen, Menlo Park, CA (US); Emily Sarah Sumner, Berkeley, CA (US); Scott Carter, San Jose, CA (US); Rumen Iliev, Milbrae, CA (US); Nikos Arechiga Gonzalez, San Mateo, CA (US); Alexandre Leo Stephen Filipowicz, Mountain View, CA (US)

(73) Assignees: TOYOTA RESEARCH INSTITUTE, INC.; TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 290 days.

(21) Appl. No.: 17/868,538

(22) Filed: Jul. 19, 2022

(65) Prior Publication Data
US 2024/0027203 A1   Jan. 25, 2024

(51) Int. Cl.
*G01C 21/34* (2006.01)
*G01C 21/36* (2006.01)
(Continued)

(52) U.S. Cl.
CPC ....... *G01C 21/343* (2013.01); *G01C 21/3469* (2013.01); *G01C 21/3476* (2013.01);
(Continued)

(58) Field of Classification Search
CPC .............. G01C 21/343; G01C 21/3469; G01C 21/3476; G01C 21/3484; G01C 21/3679; G06Q 10/047; G07C 5/004
See application file for complete search history.

(56) References Cited

U.S. PATENT DOCUMENTS 9,656,566 B2   5/2017   Kano et al.
9,863,777 B2 *  1/2018   Elwart ............... G01C 21/3492
(Continued)

FOREIGN PATENT DOCUMENTS

CN   106897788 A *  6/2017   ......... G01C 21/3644
CN   109978241 A    7/2019
(Continued)

OTHER PUBLICATIONS

Translation of CN-106897788-A, 31 pages (Year: 2017).*
Translation of CN-112781604-A, 15 pages (Year: 2021).*

*Primary Examiner* — Dale W Hilgendorf
(74) *Attorney, Agent, or Firm* — SEYFARTH SHAW LLP (57) ABSTRACT

A method for an electric vehicle trip simulator is described. The method includes determining parameters for an upcoming trip of an electric vehicle, including at least a start location and a destination location. The method also includes analyzing data associated with a plurality of points of interest between the start location and the destination location. The method further includes selecting a set of locations from the plurality of points of interest for the upcoming trip of the electric vehicle, according to the analyzing of the data. The method also includes displaying a travel order recommendation associated with the set of locations selected for the upcoming trip of the electric vehicle, including at least one charging station location according to a current charge capacity of the electric vehicle.

20 Claims, 7 Drawing Sheets

(51) Int. Cl.
　　　*G06Q 10/047*　　　(2023.01)
　　　*G07C 5/00*　　　(2006.01)
(52) U.S. Cl.
　　　CPC ..... *G01C 21/3484* (2013.01); *G01C 21/3679* (2013.01); *G06Q 10/047* (2013.01); *G07C 5/004* (2013.01)

(56) References Cited

U.S. PATENT DOCUMENTS

| | | | |
|---|---|---|---|
| 10,157,242 | B2 | 12/2018 | Fukubayashi |
| 10,272,793 | B2 * | 4/2019 | Perry ................. G01C 21/3469 |
| 12,024,046 | B2 * | 7/2024 | Kostrzewski ........... B60L 58/12 |
| 2010/0094496 | A1 * | 4/2010 | Hershkovitz ........... B60L 50/66 |
| | | | 701/22 |
| 2011/0032110 | A1 * | 2/2011 | Taguchi ................... B60L 3/12 |
| | | | 340/636.1 |
| 2012/0109519 | A1 * | 5/2012 | Uyeki ................ G01C 21/3476 |
| | | | 701/426 |
| 2012/0173134 | A1 * | 7/2012 | Gutman ............. G01C 21/3476 |
| | | | 701/400 |
| 2013/0179057 | A1 * | 7/2013 | Fisher ..................... B60L 53/66 |
| | | | 701/1 |
| 2015/0039391 | A1 * | 2/2015 | Hershkovitz ......... B60L 53/665 |
| | | | 705/7.31 |
| 2021/0107372 | A1 | 4/2021 | Viswanathan et al. |
| 2022/0101199 | A1 * | 3/2022 | Liu .................... G06Q 30/0266 |
| 2022/0318859 | A1 * | 10/2022 | Telpaz .............. G06Q 30/0281 |
| 2023/0137791 | A1 * | 5/2023 | Yararbas ........... G01C 21/3679 |
| | | | 701/123 |

FOREIGN PATENT DOCUMENTS

| | | | | |
|---|---|---|---|---|
| CN | 112406567 | A | | 2/2021 |
| CN | 112781604 | A * | 5/2021 | ......... G01C 21/3476 |
| JP | 5646877 | B2 | | 12/2014 |

* cited by examiner

TRIP SIMULATOR FOR INCREASED TIME-EFFICIENCY WHEN CHARGING

BACKGROUND

Field

Certain aspects of the present disclosure generally relate to electric vehicle technology and, more particularly, to a trip simulator for increased time-efficiency when charging.

Background

A plug-in hybrid electric vehicle (PHEV) is a type of electric vehicle (EV), which is a cross between a battery electric vehicle (BEV) and a hybrid EV (HEV). A PHEV incudes an electric motor that is recharged via an external plug and, similar to the HEV, a PHEV includes a fuel-based internal combustion engine (ICE). A difference between an HEV and a PHEV is that the PHEV can travel on electric power alone using a battery with the ability to recharge from a power grid. By contrast, BEVs do not include an ICE and are powered entirely by electricity. Instead, BEVs include electric motors powered by an onboard battery, which is charged via an external outlet.

One concern of people unfamiliar with owning a plug-in electric vehicle (EV), such as a battery electric vehicle (BEV) or plug-in hybrid electric vehicle (PHEV), is the amount of time and inconvenience to charge the plug-in EV. This issue is easily addressed for people who rarely take long trips and have access to charging at home or work. Nevertheless, for people that charge their vehicle at public charging stations (e.g., someone living in an apartment) providing efficient plans for charging may help with feeling more comfortable about owning an EV.

Many maps of charging stations are available, as well as trip planners, which suggest places to charge. While these tools show people where they can charge, they don't suggest routes that may be more efficient based on personal criteria, other than the start and end destinations. A system that optimizes over a list of locations or location types, determining the best order to visit specific locations, where to charge and for how long, is desired.

SUMMARY

A method for an electric vehicle trip simulator is described. The method includes determining parameters for an upcoming trip of an electric vehicle, including at least a start location and a destination location. The method also includes analyzing data associated with a plurality of points of interest between the start location and the destination location. The method further includes selecting a set of locations from the plurality of points of interest for the upcoming trip of the electric vehicle, according to the analyzing of the data. The method also includes displaying a travel order recommendation associated with the set of locations selected for the upcoming trip of the electric vehicle, including at least one charging station location according to a current charge capacity of the electric vehicle.

A system for an electric vehicle trip simulator is described. The system includes a trip parameters determination module to determine parameters for an upcoming trip of an electric vehicle, including at least a start location and a destination location. The system also includes a trip data analysis module to analyze data associated with a plurality of points of interest between the start location and the destination location. The system further includes a location set selection module to select a set of locations from the plurality of points of interest for the upcoming trip of the electric vehicle, according to the analyzing of the data. The system also includes a travel order display module to display a travel order recommendation associated with the set of locations selected for the upcoming trip of the electric vehicle, including at least one charging station location according to a current charge capacity of the electric vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Electric vehicle development is at an all-time high, prompting large and small original equipment manufacturers (OEM) to manufacture electrical propulsion vehicles. The term electric vehicle covers several types of electric vehicle (EVs). EVs use electricity for some of their operation, and may include the following main types. For example, one type of EV is a hybrid electric vehicle (HEV), which uses a fuel-based engine and an electric motor powered by a battery. HEVs begin operation under electric power, then the gas engine operates once the vehicle achieves a desired speed, as determined by an onboard computer system. HEVs do not rely on a plug-in for charging, which is performed through a process known as "regenerative braking."

A plug-in hybrid electric vehicle (PHEV) is another type of EV, which is a cross between a battery electric vehicle (BEV) and an HEV. A PHEV incudes an electric motor that is recharged via an external plug and, similar to the HEV, a PHEV includes a fuel-based internal combustion engine (ICE). A difference between an HEV and a PHEV is that the PHEV can travel on electric power alone using a battery with the ability to recharge from a power grid. By contrast, BEVs do not include an ICE and are powered entirely by electricity. Instead, BEVs include electric motors powered by an onboard battery, which is charged via an external outlet.

One concern of people unfamiliar with owning a plug-in electric vehicle (EV), such as a battery electric vehicle (BEV) or plug-in hybrid electric vehicle (PHEV), is the amount of time and inconvenience to charge the plug-in EV. This issue is easily addressed for people who rarely take long trips and have access to charging at home or work. Nevertheless, for people that charge their vehicle at public charging stations (e.g., someone living in an apartment) providing efficient plans for charging may help with feeling more comfortable about owning an EV.

In particular, individuals that utilize electric vehicles to take long trips may experience numerous challenges, namely the inability to estimate precisely how many times a vehicle may need to be charged along the route, how long each charging session may last, and so forth. While electric vehicle owners may have access to software application based trip planners, these planners may include basic features such as, for example, listing the number of charging stations along a particular route. Owners may, however, need additional information such as the best order in which to visit specific locations in addition to where to go in order to charge the vehicle.

In practice, maps of charging stations are available, as well as trip planners, which suggest places to charge. While these tools show people where they can charge, they do not suggest routes that may be more efficient based on personal criteria, other than the start and end destinations. A system that optimizes over a list of locations or location types, determining the best order to visit specific locations, where to charge and for how long, is desired.

Some aspects of the present disclosure are directed to a trip simulator for increased time-efficiency when charging. Conventionally, internal combustion engine vehicle (ICEV) owners are used to gassing up their vehicles and many tend to drive to the same places. By collecting historical information about the businesses and places where a person drives to over a period of time, the trip simulator may suggest efficient routes that minimize a set of criteria. For example, this set of criteria may include a wait time for a charger, minimizing a number of times using the charger, a distance driven, time of day constraints for visiting a location, or non-substitutable locations, such as a favorite store. The set of criteria used by the trip simulator system may be specified by a person, or a default weighting may be used.

In some aspects of the present disclosure, the trip simulator system is used by someone considering buying a battery electric vehicle (BEV), a plug-in hybrid vehicle (PHEV), or other like electric vehicle that relies on a charging station to continue operation. In some aspects of the present disclosure, the amount of trip information shared by a user may be incomplete relative to the set of criteria noted above, in which case the trip simulator system selects a replacement set of criteria, such as a replacement business. For example, if the user specifies a "grocery store," then a grocery store at a nearby location is selected. In this example, the selected grocery store is personalized by the types of other locations that the person visits or other historic information available regarding the user, as well as other candidate locations from which to select. In some aspects of the present disclosure, the trip simulator system considers the convenience of the stores, given the other locations to be visited, as well as charging availability, if needed, depending on the available driving range of the electric vehicle (EV).

In some aspects of the present disclosure, the trip simulator system determines, from historic information that is specific to a user, a set of locations to visit, a preferred order and time at which these locations should be visited, alternative locations in response to specification of an upcoming trip of the EV. For example, the trip simulator system collects various types of data about different locations, such as how long individuals tend to spend at a location near a charging station location, historical data about wait times or charging speeds, and other like information. This information may be used to estimate the actual time a user waits for a charger at a charging station location. In addition, this information may include a charging time to complete charging at the charging station location, as well as an amount of extra charge that may be needed. The trip simulator system may then determine an optimal route, as well as good alternative routes, taking into account a time when charging is specified. The trip simulator system may display the best route as well as alternative routes and information to alter the trip.

In some aspects of the present disclosure, the trip simulator system is implemented as a software application, accessible via a computing device installed as part of an electric vehicle or a mobile device of the user. In some aspects of the present disclosure, the trip simulator system provides electric vehicle owners with (1) a set of locations along a route from a source to a destination location, and (2) a preferred order and times during which these locations should be visited. Additionally, the trip simulator system provides different types of data associated with one or more of these locations such as, for example, how long people tend to spend time at a location near a charger, historical data about wait times or charging speeds, and other like information. The trip simulator system above utilizes data about how long people spend at a location near a charging station location, as well as historical data about wait times to determine wait times at a particular charging station. The trip simulator system may display a preferred or "optimal" route, alternative routes, and so forth, from a start location to a destination location.

Figure 1:
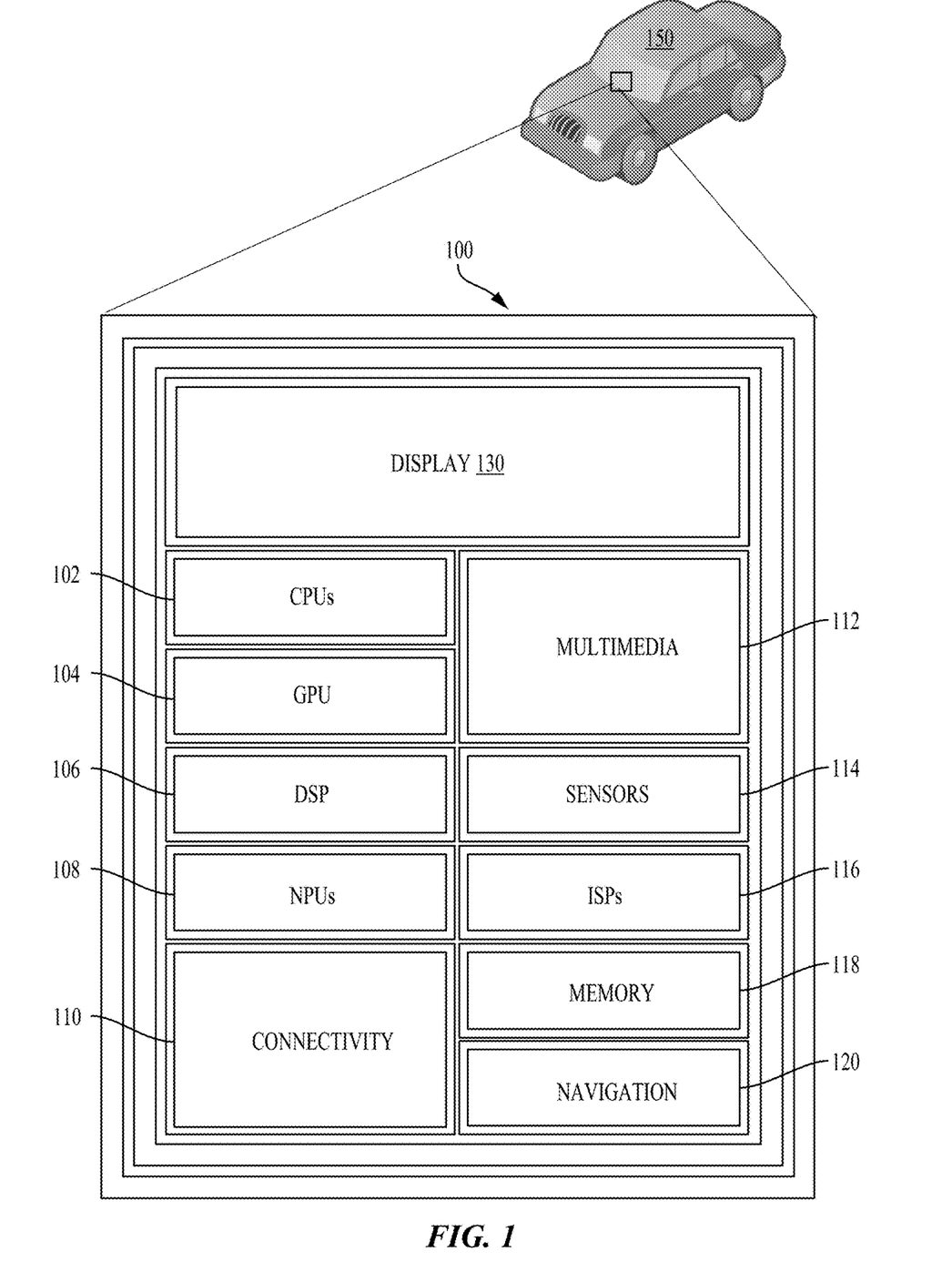
FIG. 1 illustrates an example implementation of designing a neural network using a system-on-a-chip (SOC) for an electric vehicle trip simulator system, in accordance with aspects of the present disclosure.

FIG. 1 illustrates an example implementation of the aforementioned system and method for an electric vehicle trip simulator system using a system-on-a-chip (SOC) 100 of an electric vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include sensors 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the electric vehicle 150, which may be implemented as an autonomous or semi-autonomous vehicle. In this arrangement, the electric vehicle 150 may include a processor and other features of the SOC 100. In this aspect of the present disclosure, instructions loaded into a processor (e.g., CPU 102 or the NPU 108) of the electric vehicle 150 may include program code to determine parameters for an upcoming trip of the electric vehicle 150 using the display 130, including at least a start location and a destination location. The instructions loaded into the processor may also include program code to analyze data associated with a plurality of points of interest between the start location and the destination location. The instructions loaded into a processor may further include program code to select a set of locations from the plurality of points of interest for the upcoming trip of the electric vehicle 150, according to the analyzing of the data. The instructions loaded into the processor may also include program code to display a travel order recommendation associated with the selected set of the locations for the upcoming trip of the electric vehicle 150, including at the at least one charging station location according to a current charge capacity of the electric vehicle 150.

Figure 2:
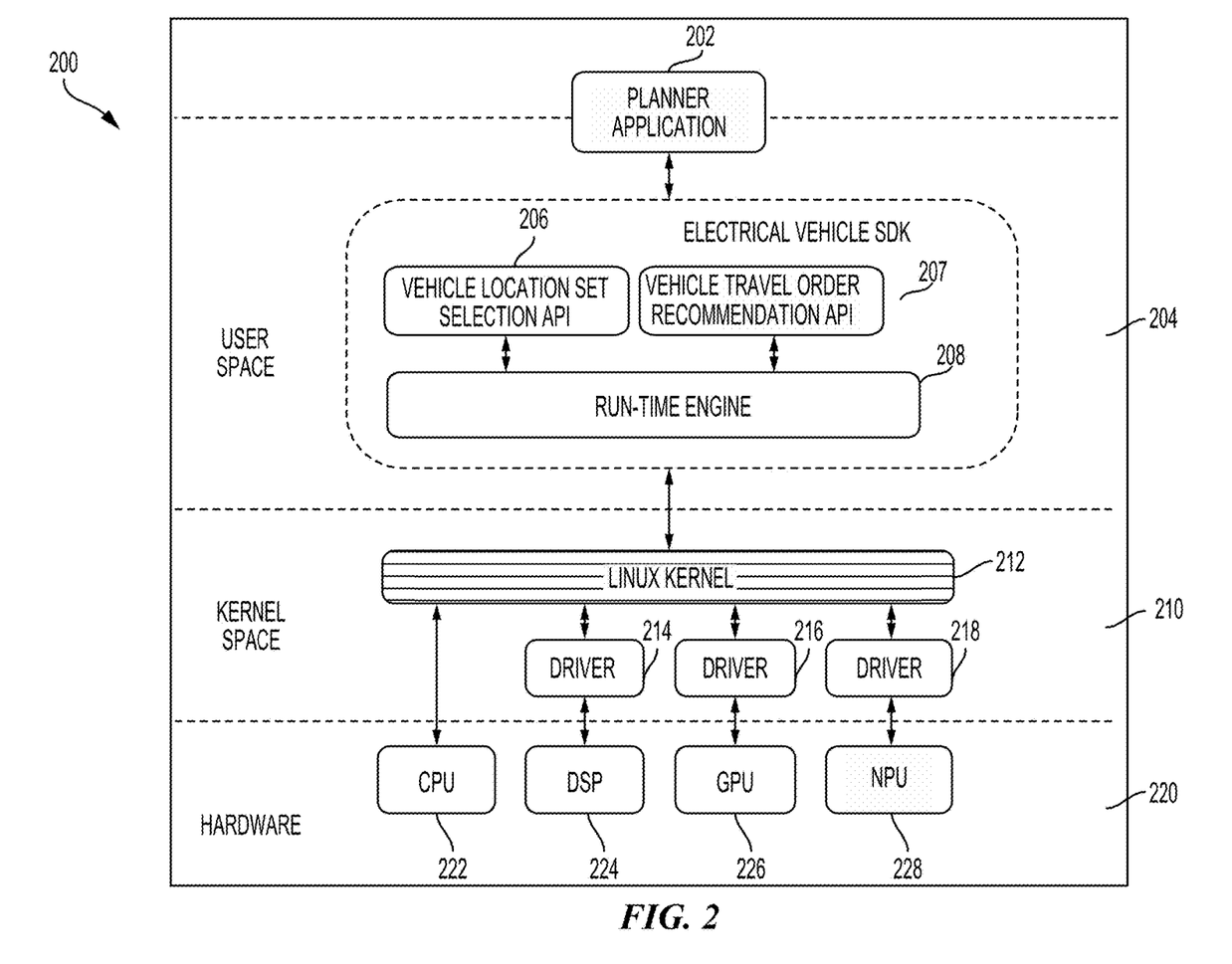
FIG. 2 is a block diagram illustrating a software architecture that may modularize artificial intelligence (AI) functions for an electric vehicle trip simulator system of an electric, autonomous vehicle, according to aspects of the present disclosure.

FIG. 2 is a block diagram illustrating a software architecture 200 that may modularize artificial intelligence (AI) functions for an electric vehicle trip simulator system of an electric, autonomous vehicle, according to aspects of the present disclosure. Using the architecture, a planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the planner application 202. While FIG. 2 describes the software architecture 200 for planning a vehicle control action of an autonomous vehicle according to a selected upcoming trip of the electric vehicle, it should be recognized that the electric vehicle trip planning functionality is not limited to autonomous vehicles. According to aspects of the present disclosure, the electric vehicle trip planning functionality is applicable to any electric vehicle type, provided the electric vehicle is equipped with appropriate functions of an advanced driver assistance system (ADAS).

The planner application 202 may be configured to call functions defined in a user space 204 that may, for example, provide for electric vehicle trip planning services. The planner application 202 may make a request to compile program code associated with a library defined in a vehicle location set selection application programming interface (API) 206 to select a set of locations from the plurality of points of interest for the upcoming trip of the electric vehicle, according to analyzing data associated with a plurality of points of interest between a start location and a destination location. The planner application 202 may make a request to compile program code associated with a vehicle travel order recommendation API 207 to display a travel order recommendation associated with the selected set of the locations for the upcoming trip of the electric vehicle, including at the at least one charging station location according to a current charge capacity of the electric vehicle.

A run-time engine 208, which may be compiled code of a runtime framework, may be further accessible to the planner application 202. The planner application 202 may cause the run-time engine 208, for example, to take actions for controlling the electric, autonomous vehicle. When an electric vehicle intends to make a trip, the run-time engine 208 may in turn send a signal to an operating system 210, such as a Linux Kernel 212, running on the SOC 220. FIG. 2 illustrates the Linux Kernel 212 as software architecture for implementing vehicle trip planning of an electric, autonomous vehicle. It should be recognized, however, aspects of the present disclosure are not limited to this exemplary software architecture. For example, other kernels may be used to provide the software architecture to support electric vehicle trip planning functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
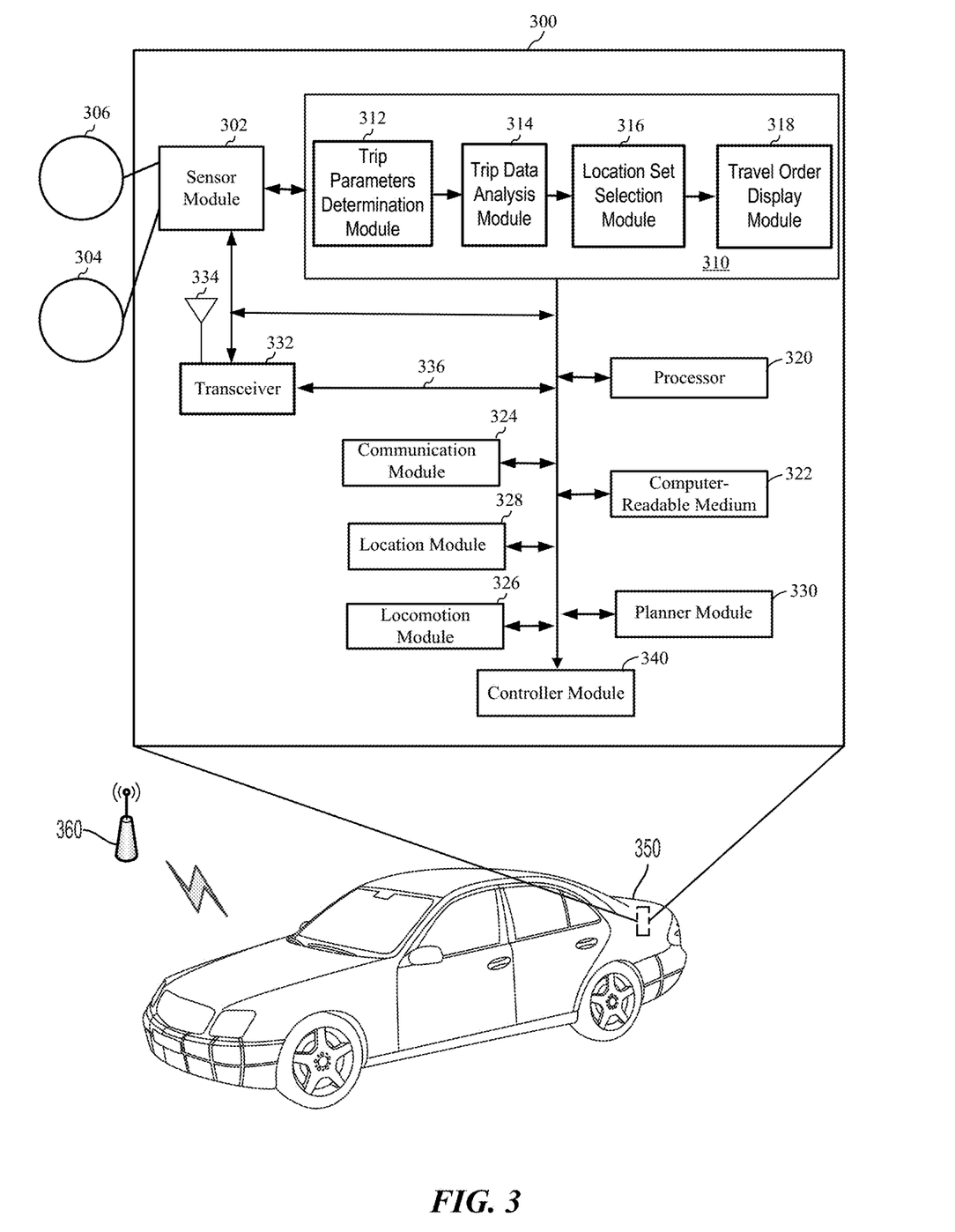
FIG. 3 is a diagram illustrating an example of a hardware implementation for an electric vehicle trip simulator system, according to aspects of the present disclosure.

FIG. 3 is a diagram illustrating an example of a hardware implementation for an electric vehicle trip simulator system 300, according to aspects of the present disclosure. The electric vehicle trip simulator system 300 may be configured for electric vehicle trip simulation to provide increased time-efficiency when charging. The electric vehicle trip simulator system 300 may be a component of an electric, autonomous vehicle, or other non-autonomous device (e.g., non-autonomous vehicles, ride-share cars, etc.). For example, as shown in FIG. 3, the electric vehicle trip simulator system 300 is a component of an electric vehicle 350.

Aspects of the present disclosure are not limited to the electric vehicle trip simulator system 300 being a component of the electric vehicle 350. Other devices, such as a bus, motorcycle, or other like electric vehicle, are also contemplated for implementing the electric vehicle trip simulator system 300. In this example, the electric vehicle 350 may be autonomous or semi-autonomous; however, other configurations for the electric vehicle 350 are contemplated, such as an advanced driver assistance system (ADAS).

The electric vehicle trip simulator system 300 may be implemented with an interconnected architecture, represented generally by an interconnect 336. The interconnect 336 may include any number of point-to-point interconnects, buses, and/or bridges depending on the specific application of the electric vehicle trip simulator system 300 and the overall design constraints. The interconnect 336 links together various circuits including one or more processors and/or hardware modules, represented by a sensor module 302, a vehicle trip planner 310, a processor 320, a computer-readable medium 322, a locomotion module 326, a location module 328, a communication module 324, a planner module 330, and a controller module 340. The interconnect 336 may also link various other circuits such as timing sources, peripherals, voltage regulators, and power management circuits, which are well known in the art, and therefore, will not be described any further.

The electric vehicle trip simulator system 300 includes a transceiver 332 coupled to the sensor module 302, the vehicle trip planner 310, the processor 320, the computer-readable medium 322, the locomotion module 326, the location module 328, the communication module 324, the planner module 330, and the controller module 340. The transceiver 332 is coupled to an antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle trip planner 310 to/from connected vehicles within the vicinity of the electric vehicle 350.

The electric vehicle trip simulator system 300 includes the processor 320 coupled to the computer-readable medium 322. The processor 320 performs processing, including the execution of software stored on the computer-readable medium 322 to provide functionality according to the disclosure. The software, when executed by the processor 320, causes the electric vehicle trip simulator system 300 to perform the various functions described for vehicle trip planning of the electric vehicle 350, or any of the modules (e.g., 302, 310, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle trip planner 310, the locomotion module 326, the location module 328 the communication module 324, the planner module 330, and/or the controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the electric vehicle 350 or may be in communication with the electric vehicle 350.

The location module 328 may determine a location of the electric vehicle 350. For example, the location module 328 may use a global positioning system (GPS) to determine the location of the electric vehicle 350. The location module 328 may implement a dedicated short-range communication (DSRC)-compliant GPS unit. A DSRC-compliant GPS unit includes hardware and software to make the electric vehicle 350 and/or the location module 328 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the electric vehicle 350 that are not modules of the electric vehicle trip simulator system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The electric vehicle trip simulator system 300 also includes the vehicle trip planner 310 for planning a route and controlling the locomotion of the electric vehicle 350, via the locomotion module 326 for autonomous operation of the electric vehicle 350. In one configuration, the vehicle trip planner 310 may override a user input when the user input is expected (e.g., predicted) to cause a collision according to an autonomous level of the electric vehicle 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the electric vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle trip planner 310 may be in communication with the sensor module 302, the processor 320, the computer-readable medium 322, the locomotion module 326, the location module 328, the communication module 324, the transceiver 332, the planner module 330, and the controller module 340. In one configuration, the vehicle trip planner 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle trip planner 310 may receive sensor data directly from the first sensor 306 and the second sensor 304 to determine, for example, input traffic data images.

As shown in FIG. 3, the vehicle trip planner 310 includes a trip parameters determination module 312, a trip data analysis module 314, a location set selection module 316, and a travel order display module 318. The trip parameters determination module 312, the trip data analysis module 314, the location set selection module 316, and the travel order display module 318 may be components of a same or different artificial neural network, such as a deep convolutional neural network (CNN). The vehicle trip planner 310 is not limited to a CNN.

The trip parameters determination module 312 may be configured to determine parameters for an upcoming trip of the electric vehicle 350 using the display 130 of FIG. 1, including at least a start location and a destination location. The trip data analysis module 314 may be configured to analyze data associated with a plurality of points of interest between the start location and the destination location. In these aspects of the present disclosure, the location set selection module 316 is configured to select a set of locations from the plurality of points of interest for the upcoming trip of the electric vehicle 350, according to the analyzing of the data. Once the set of locations is selected, the travel order display module 318 is configured to display a travel order recommendation associated with the selected set of the locations for the upcoming trip of the electric vehicle 350, including at the at least one charging station location according to a current charge capacity of the electric vehicle 350, for example, as shown in FIG. 4.

Figure 4:
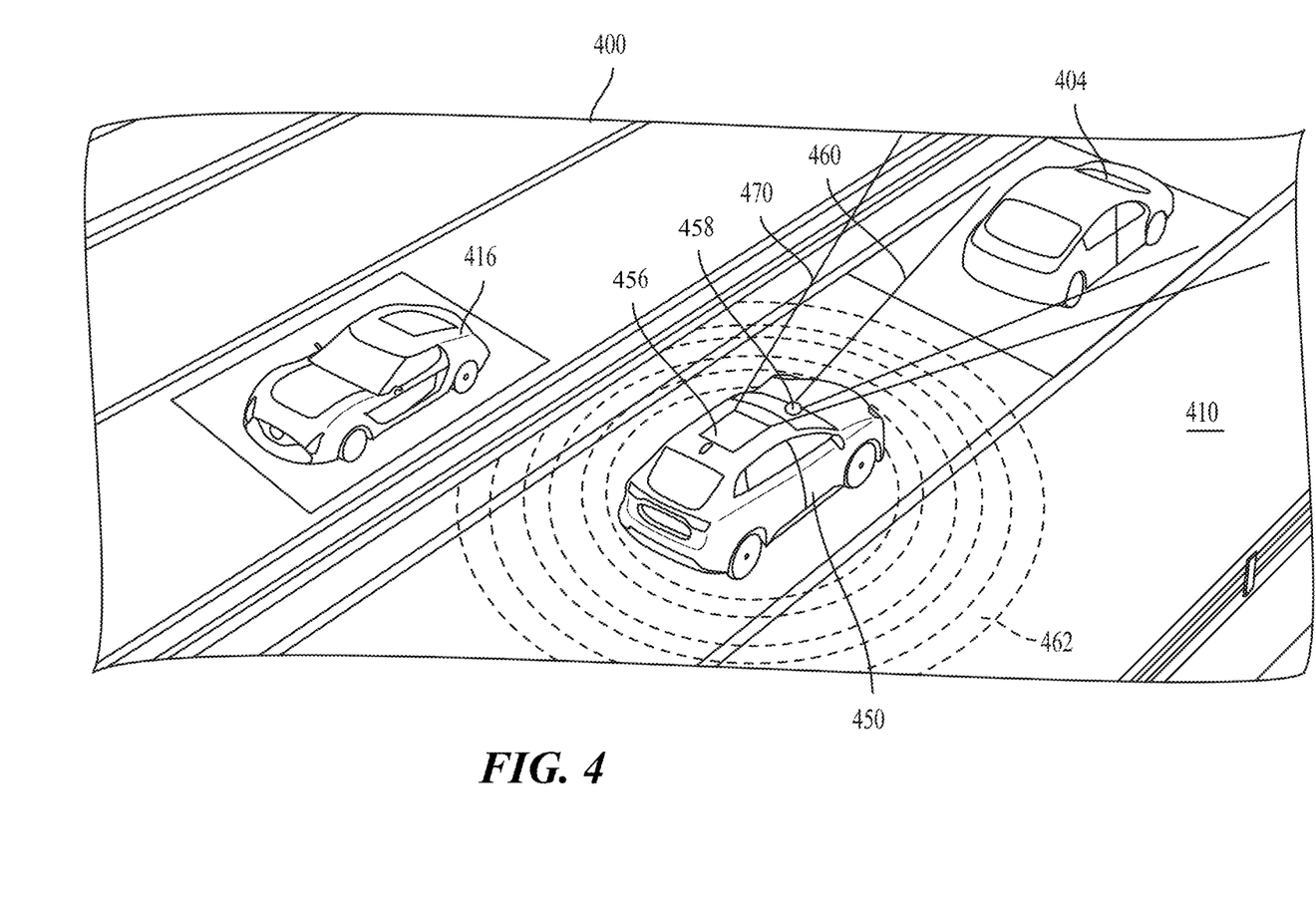
FIG. 4 is a drawing illustrating an example of an electric vehicle in an environment, according to aspects of the present disclosure.

FIG. 4 illustrates an example of an electric vehicle 450 (e.g., the electric vehicle 350) in an environment 400, according to aspects of the present disclosure. As shown in FIG. 4, the electric vehicle 450 is traveling on a road 410. A first vehicle 404 (e.g., other agent) may be ahead of the electric vehicle 450, and a second vehicle 416 may be adjacent to the electric vehicle 450. In this example, the electric vehicle 450 may include a 2D camera 456, such as a 2D red-green-blue (RGB) camera, and a light detection and ranging (LIDAR) camera 458. Alternatively, the LIDAR camera 458 may be another RGB camera or another type of sensor, such as ultrasound, and/or a radio detection and ranging (RADAR) sensor, as shown by reference number 462. Additionally, or alternatively, the electric vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The LIDAR camera 458 may generate LIDAR point cloud sequences. The LIDAR point cloud sequences captured by the LIDAR camera 458 may include a 3D point cloud of the first vehicle 404, as the first vehicle 404 is in the field of view 470 of the LIDAR camera 458. A field of view 460 of the 2D camera 456 is also shown.

The information obtained from the 2D camera 456 and the LIDAR camera 458 may be used to navigate the electric vehicle 450 along a route when the electric vehicle 450 is in an autonomous mode. The 2D camera 456 and the LIDAR camera 458 may be powered from electricity provided from the battery (not shown) of the electric vehicle 450. The battery may also power the motor of the electric vehicle 450. The information obtained from the LIDAR camera 458 may be used to estimate bounding boxes using self-supervised learning based on detected object traces within LIDAR point clouds.

One concern of people unfamiliar with owning a plug-in electric vehicle (EV), such as a battery electric vehicle (BEV) or plug-in hybrid electric vehicle (PHEV), is the amount of time and inconvenience to charge the plug-in EV. This issue is easily addressed for people who rarely take long trips and have access to charging at home or work. Nevertheless, for people that charge their vehicle at public charging stations (e.g., someone living in an apartment) providing efficient plans for charging may help with feeling more comfortable about owning an EV.

In particular, individuals that utilize electric vehicles to take long trips may experience numerous challenges, namely the inability to estimate precisely how many times a vehicle may need to be charged along the route, how long each charging session may last, and so forth. While electric vehicle owners may have access to software application based trip planners, these planners may include basic features such as, for example, listing the number of charging stations along a particular route. Owners may, however, need additional information such as the best order in which to visit specific locations in addition to where to go in order to charge the vehicle.

Figure 5:
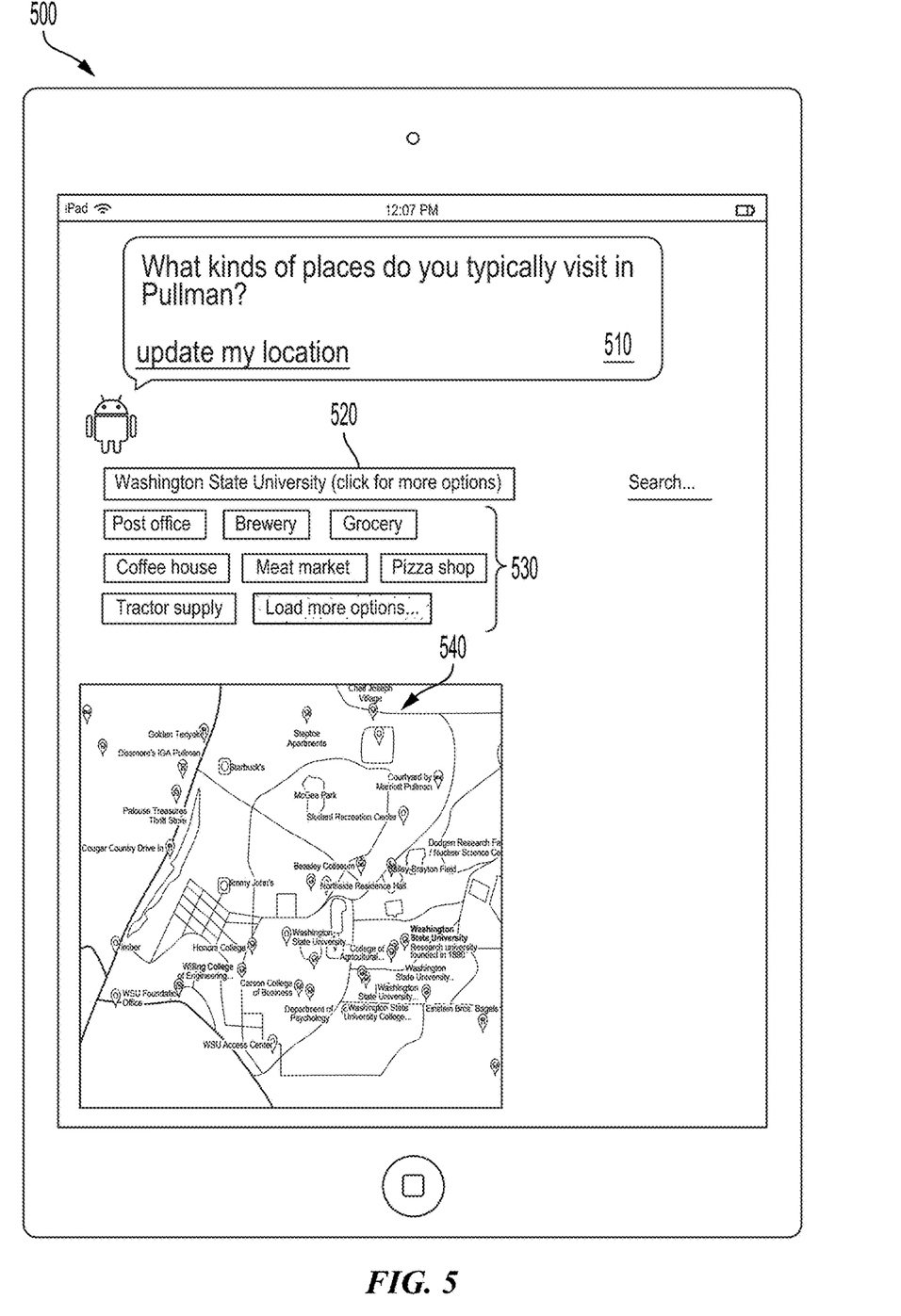
FIG. 5 is a diagram illustrating an electric vehicle trip simulator application in a trip parameter selection mode, according to aspects of the present disclosure.

FIG. 5 is a diagram illustrating an electric vehicle trip simulator application 500 in a trip parameter selection mode, according to aspects of the present disclosure. The electric vehicle trip simulator application 500 may beneficially provide increased time-efficiency when charging an electric vehicle. In practice, internal combustion engine vehicle (ICEV) owners are accustomed to gassing up their vehicles and many tend to drive to the same locations. As shown in FIG. 5, the electric vehicle trip simulator application 500 learns by collecting historical information about the businesses and places where a person drives to over a period of time. In this example, a user resides in Pullman, Washington, near Washington State University. As shown in the bubble 510, the electric vehicle trip simulator application 500 may inquire as to typically visited places in Pullman and provides the user the option to update the location.

As further illustrated in FIG. 5, the electric vehicle trip simulator application 500 includes a location button 520 and associated buttons 530 to collect information regarding the user's preferred locations to visit. In this example, the associated buttons 530 include a post office button, a brewery button, a grocery button, a coffee house button, a meat market button, a pizza shop button, a tractor supply button, and a load more options button. The electric vehicle trip simulator application 500 includes a map 540 based on the location button 520, which may be used to depict the preferred locations visited by the user, as well as charging station locations for charging the electric vehicle of the user.

In operation, the electric vehicle trip simulator application 500 determines a start location of an upcoming trip of the electric vehicle based on the current location of the electric vehicle, and the user provides a destination location. In some aspects of the present disclosure, the electric vehicle trip simulator application 500 may suggest efficient routes between the start location and the destination location that minimize a set of criteria. For example, this set of criteria may include a wait time for a charger, minimizing a number of times using the charger, a distance driven, time of day constraints for visiting a location, or non-substitutable locations, such as a favorite store. The set of criteria used by the electric vehicle trip simulator application 500 may be specified by a person, or a default weighting may be used, for example, as shown in FIG. 6.

Figure 6:
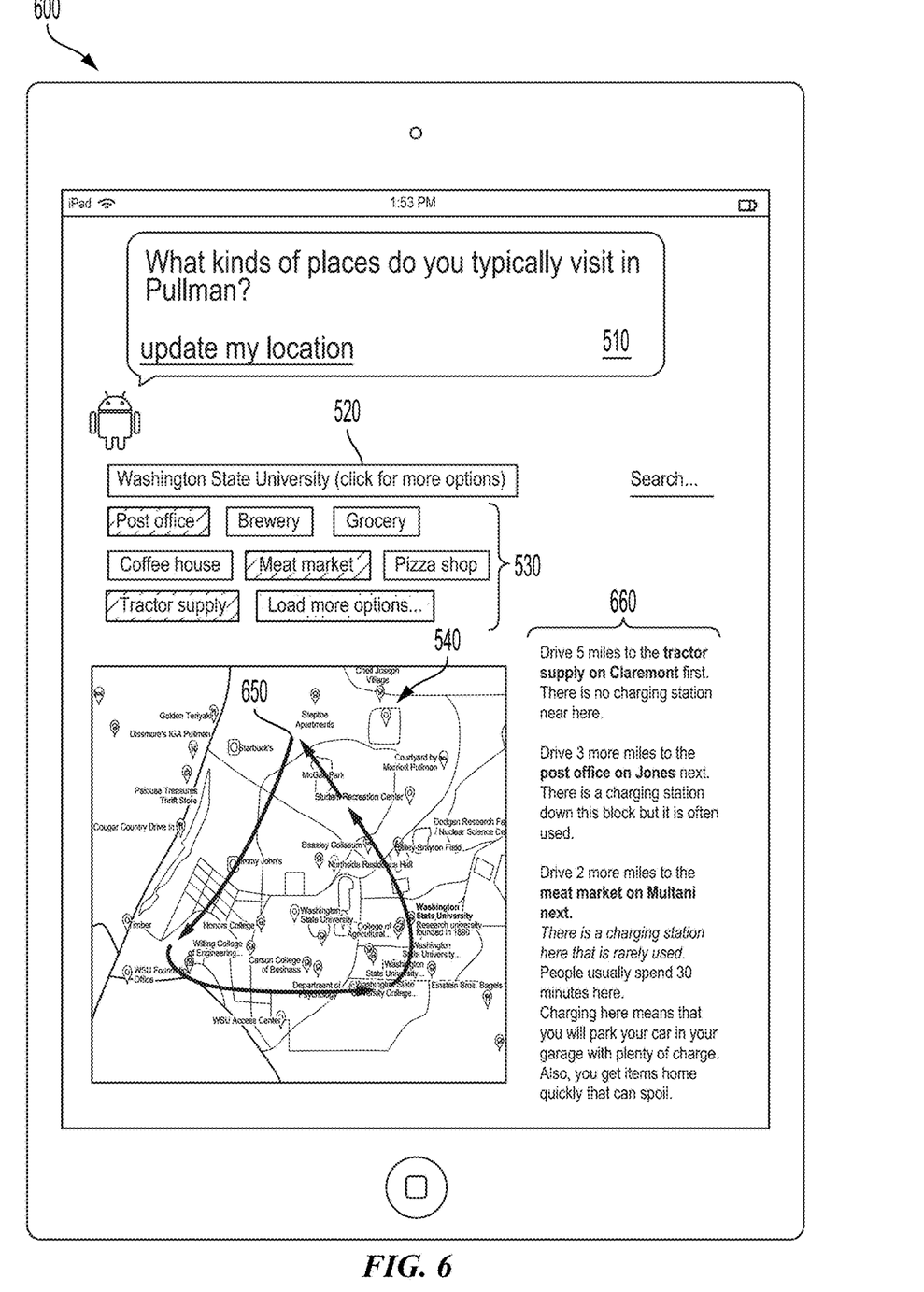
FIG. 6 is a diagram further illustrating the electric vehicle trip simulator application of FIG. 5 in a trip simulator mode, according to aspects of the present disclosure.

FIG. 6 is a diagram further illustrating the electric vehicle trip simulator application 500 of FIG. 5 in a trip simulator mode, according to aspects of the present disclosure. The electric vehicle trip simulator application 600 is used by someone considering buying a battery electric vehicle (BEV), a plug-in hybrid vehicle (PHEV) or other like electric vehicle (EV) that relies on a charging station to continue operation. In some aspects of the present disclosure, the amount of trip information shared by a user may be incomplete relative to the set of criteria noted in FIG. 5. In this case, the electric vehicle trip simulator application 600 selects a replacement set of criteria, such as a replacement business. For example, if the user specifies a "grocery store," then a grocery store at a nearby location is selected. In this example, the selected grocery store is personalized by the types of other locations that the person visits or other historic information available regarding the user, as well as other candidate locations from which to select. In some aspects of the present disclosure, the electric vehicle trip simulator application 600 considers the convenience of the stores, given the other locations visited, as well as charging availability, if needed, depending on the available driving range of the EV.

As shown in FIG. 6, the electric vehicle trip simulator application 600 determines, from historic information that is specific to a user, a set of locations to visit (optimal route 650), a preferred order and time at which these locations should be visited in an itinerary 660, in response to specification of an upcoming trip of the EV. For example, the electric vehicle trip simulator application 600 uses various types of collected data regarding different locations, such as how long individuals tend to spend at a location near a charging station location, historical data about wait times or charging speeds, and other like collected information.

In some aspects of the present disclosure, historical information is used by the electric vehicle trip simulator application 600 to estimate the actual time a user waits for a charger at a charging station location. In addition, this information may include a charging time to complete charging at the charging station location, as well as an amount of extra charge that may be needed. The electric vehicle trip simulator application 600 determines the optimal route 650, as well as the itinerary 660, taking into account a time when charging is specified. The electric vehicle trip simulator application 600 displays the optimal route 650 on the map 540, as well as the itinerary 660 and information to alter the trip. In this example, the itinerary 660 specifies to drive 2 more miles to the meat market on Multani, and the information for altering the trip, such as the proximity of a charging station location and an amount of time to charge (e.g., 30 minutes).

As shown in FIGS. 5 and 6, the electric vehicle trip simulator system 300 of FIG. 3 is implemented as a software application, accessible via a computing device installed as part of an electric vehicle or a mobile device of the user. In some aspects of the present disclosure, the electric vehicle trip simulator application 600 provides electric vehicle owners with (1) a set of locations along a route from a start location to a destination location, and (2) a preferred order and times during which these locations should be visited. Additionally, the electric vehicle trip simulator application 600 provides different types of data associated with one or more of these locations such as, for example, how long people tend to spend time at a location near a charger, historical data about wait times or charging speeds, and other like information. The electric vehicle trip simulator application 600 may also indicate benefits of charging at a charging station location during the trip, for example as shown in FIG. 6. The electric vehicle trip simulator application 600 displays the optimal route 650 and the itinerary 660, alternative routes, and so forth, from a start location to a destination location, for example, as further described in FIG. 7.

Figure 7:
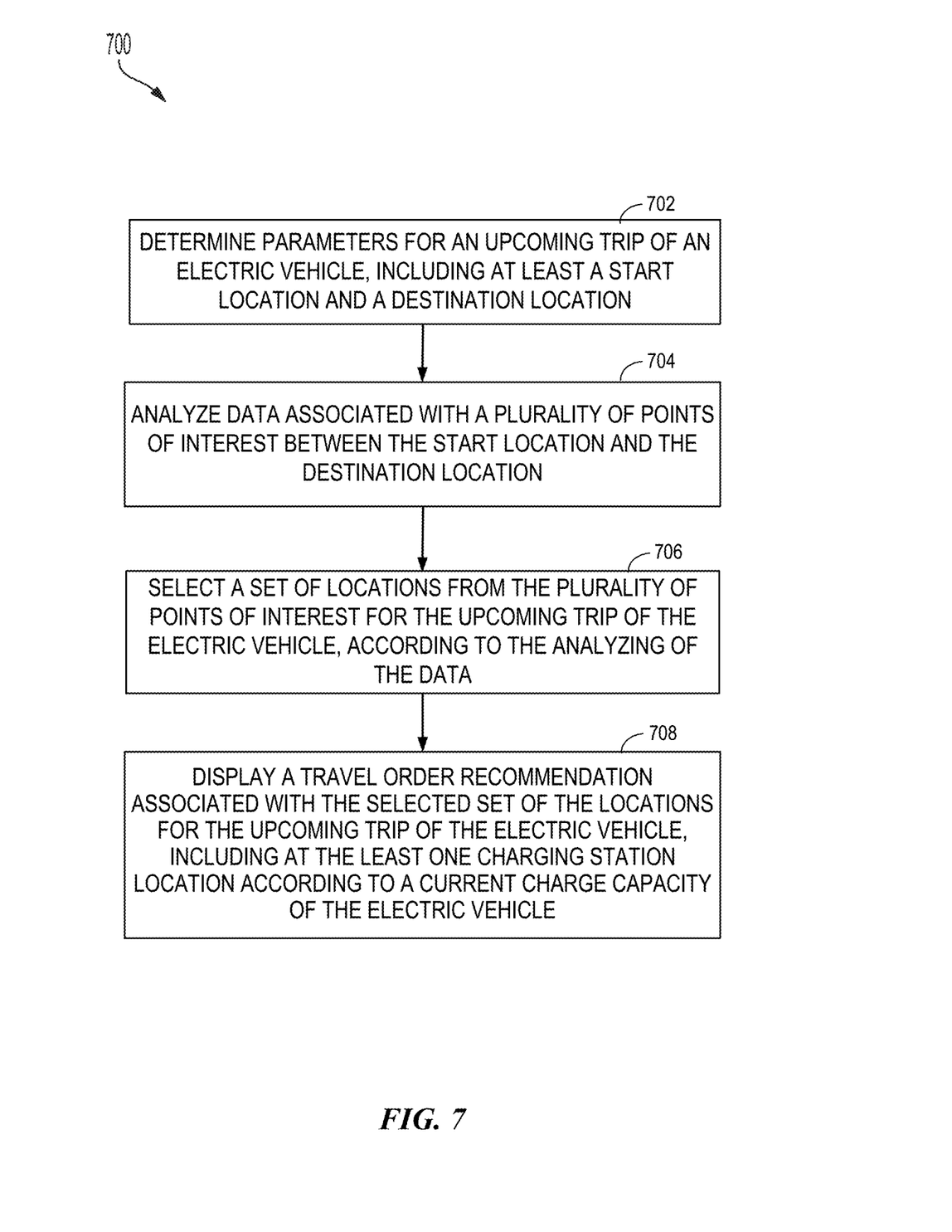
FIG. 7 is a flowchart illustrating a method for an electric vehicle trip simulator, according to aspects of the present disclosure.

FIG. 7 is a flowchart illustrating a method for an electric vehicle trip simulator, according to aspects of the present disclosure. The method 700 begins at block 702, in which parameters for an upcoming trip of an electric vehicle (EV) are determined, including at least a start location and a destination location. For example, in FIG. 5, the electric vehicle trip simulator application 500 determines a start location of an upcoming trip of the electric vehicle based on the current location of the electric vehicle, and the user provides a destination location and a round trip for returning to the start location. The electric vehicle trip simulator application 500 may suggest efficient routes between the start location and the destination location that minimize a set of criteria. For example, this set of criteria may include a wait time for a charger, minimizing a number of times using the charger, a distance driven, time of day constraints for visiting a location, or non-substitutable locations, such as a favorite store. The set of criteria used by the electric vehicle trip simulator system 300 of FIG. 3 may be specified by a person, or a default weighting may be used, for example, as shown in FIG. 6.

At block 704, data associated with a plurality of points of interest between the start location and the destination location is analyzed. For example, as shown in FIG. 5, the user shares trip information, which may be incomplete. In this case, the electric vehicle trip simulator application 500 may select a replacement set of criteria, such as a replacement business. For example, if the user specifies a "grocery store," then a grocery store at a nearby location is selected. In this example, the selected grocery store is personalized by the types of other locations that the person visits or other historic information available regarding the user as well as other candidate locations from which to select. In some aspects of the present disclosure, the trip simulator system considers the convenience of the stores, given the other locations to visit, as well as charging availability, if needed, depending on the available driving range of the EV.

At block 706, a set of locations is selected from the plurality of points of interest for the upcoming trip of the electric vehicle, according to the analyzing of the data. For example, in FIG. 6, the electric vehicle trip simulator application 600 determines, from historic information that is specific to a user, a set of locations to visit (e.g., an optimal route 650), a preferred order and time at which these locations should be visited (e.g., in an itinerary 660), in response to specification of an upcoming trip of the EV. For example, the electric vehicle trip simulator application 600 uses various types of collected data regarding different locations, such as how long individuals tend to spend at a location near a charging station location, historical data about wait times or charging speeds, and other like collected information.

At block 708, a travel order recommendation associated with the selected set of the locations for the upcoming trip of the electric vehicle is displayed, including at the at least one charging station location according to a current charge capacity of the electric vehicle. For example, as shown in FIG. 6, the electric vehicle trip simulator application 600 provides electric vehicle owners with (1) a set of locations along a route from a start location to a destination location, and (2) a preferred order and times during which these locations should be visited. Additionally, the electric vehicle trip simulator application 600 provides different types of data associated with one or more of these locations such as, for example, how long people tend to spend time at a location near a charger, historical data about wait times or charging speeds, and other like information. The electric vehicle trip simulator application 600 may also indicate benefits of charging at a charging station location during the trip, for example as shown in FIG. 6. The electric vehicle trip simulator application 600 displays the optimal route 650 and the itinerary 660, alternative routes, and so forth, from a start location to a destination location The method 700 may display the travel order recommendation by determining an available driving range of the electric vehicle according to the current charge capacity of the electric vehicle. In addition, displaying the travel order recommendation may include identifying the at least one charging station location along the upcoming trip of the electric vehicle when a distance of the upcoming trip is greater than the available range of the electric vehicle. The method 700 may display the travel order recommendation by determining a wait time to initiate a charge at the at least one charging station location. In addition, displaying the travel order recommendation may include determining a duration time to complete the charge at the at least one charging station location. The method 700 may display the travel order recommendation by displaying a preferred order and times during which to visit the selected set of the locations for the upcoming trip of the electric vehicle. The method 700 may display the travel order recommendation by displaying an alternative order and alternative times during which to visit the selected set of the locations for the upcoming trip of the electric vehicle, for example, as shown in FIGS. 5 and 6.

The method 700 may also include displaying the at least one charging station location on a map illustrating the travel order recommendation associated with the selected set of the locations for the upcoming trip of the electric vehicle. The method 700 may also include displaying the wait time to initiate the charge at the at least one charging station location. The method 700 may also include displaying the duration time to complete the charge at the at least one charging station location. The method 700 may also include determining wait times associated with one or more charging stations located near the destination location based on historical information regarding the one or more charging stations located near the destination location. The method 700 may also include determining the start location and the destination location by displaying a map in response to a user request to perform a trip to the destination location. The method 700 may also include determining the start location and the destination location by requesting personalized information from the user regarding frequently visited locations, for example, as shown in FIGS. 5 and 6.

In some aspects of the present disclosure, the method shown in FIG. 7 may be performed by the SOC 100 (FIG. 1) or the software architecture 200 (FIG. 2) of the electric vehicle 150. That is, each of the elements or methods may, for example, but without limitation, be performed by the SOC 100, the software architecture 200, the processor (e.g., CPU 102), and/or other components included therein of the electric vehicle 150, or the electric vehicle trip simulator system 300.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for an electric vehicle trip simulator, the method comprising:
   determining parameters for an upcoming trip of an electric vehicle, including at least a start location and a destination location;
   analyzing data associated with a plurality of points of interest between the start location and the destination location;
   selecting a set of locations from the plurality of points of interest for the upcoming trip of the electric vehicle, according to the analyzing of the data and user-specific historical information;
   displaying a travel order recommendation associated with the set of locations selected for the upcoming trip of the electric vehicle on a map;
   concurrently displaying an itinerary to perform the travel order recommendation adjacent to the map, including each selected location, a distance to reach a next selected location, an indication of whether a charging station is proximate each selected location, and a selected charging station location for the upcoming trip including a rationale for the selected charging station location according to a current charge capacity of the electric vehicle; and
   controlling the electric vehicle according to the itinerary to reach the destination location.

2. The method of claim 1, in which displaying the travel order recommendation comprises:
   determining an available driving range of the electric vehicle according to the current charge capacity of the electric vehicle; and
   identifying the selected charging station location along the upcoming trip of the electric vehicle when a distance of the upcoming trip is greater than the available driving range of the electric vehicle.

3. The method of claim 1, in which displaying the travel order recommendation comprises:
   determining a wait time to initiate a charge at the selected charging station location; and
   determining a duration time to complete the charge at the selected charging station location.

4. The method of claim 3, further comprising:
   displaying the selected charging station location on the map illustrating the travel order recommendation associated with the set of locations selected for the upcoming trip of the electric vehicle;
   displaying the wait time to initiate the charge at the selected charging station location; and
   displaying the duration time to complete the charge at the selected charging station location.

5. The method of claim 1, in which displaying the travel order recommendation comprises displaying a preferred order and times during which to visit the set of locations selected for the upcoming trip of the electric vehicle.

6. The method of claim 1, in which displaying the travel order recommendation comprises displaying an alternative order and alternative times relative to the travel order recommendation during which to visit the set of locations selected for the upcoming trip of the electric vehicle.

7. The method of claim 1, further comprising determining wait times associated with one or more charging stations located near the destination location based on historical information regarding the one or more charging stations located near the destination location.

8. The method of claim 1, in which determining the start location and the destination location comprises:
   displaying the map in response to a user request to perform the upcoming trip to the destination location; and
   requesting personalized information from a user regarding frequently visited locations.

9. A non-transitory computer-readable medium having program code recorded thereon for an electric vehicle trip simulator, the program code being executed by a processor and comprising:
   program code to determine parameters for an upcoming trip of an electric vehicle, including at least a start location and a destination location;
   program code to analyze data associated with a plurality of points of interest between the start location and the destination location;
   program code to select a set of locations from the plurality of points of interest for the upcoming trip of the electric vehicle, according to the analyzing of the data and user-specific historical information;
   program code to display a travel order recommendation associated with the set of locations selected for the upcoming trip of the electric vehicle on a map;
   program code to concurrently display an itinerary to perform the travel order recommendation adjacent to the map, including each selected location, a distance to reach a next selected location, an indication of whether a charging station is proximate each selected location, and a selected charging station location for the upcoming trip including a rationale for the selected charging station location according to a current charge capacity of the electric vehicle; and
   program code to control the electric vehicle according to the itinerary to reach the destination location.

10. The non-transitory computer-readable medium of claim 9, in which the program code to display the travel order recommendation comprises:
    program code to determine an available driving range of the electric vehicle according to the current charge capacity of the electric vehicle; and
    program code to identify the selected charging station location along the upcoming trip of the electric vehicle when a distance of the upcoming trip is greater than the available driving range of the electric vehicle.

11. The non-transitory computer-readable medium of claim 9, in which the program code to display the travel order recommendation comprises:
    program code to determine a wait time to initiate a charge at the selected charging station location; and
    program code to determine a duration time to complete the charge at the selected charging station location.

12. The non-transitory computer-readable medium of claim 11, further comprising:
    program code to display the selected charging station location on the map illustrating the travel order recommendation associated with the set of locations selected for the upcoming trip of the electric vehicle;
    program code to display the wait time to initiate the charge at the selected charging station location; and
    program code to display the duration time to complete the charge at the selected charging station location.

13. The non-transitory computer-readable medium of claim 9, in which the program code to display the travel order recommendation comprises program code to display a preferred order and times during which to visit the set of locations selected for the upcoming trip of the electric vehicle.

14. The non-transitory computer-readable medium of claim 9, in which the program code to display the travel order recommendation comprises program code to display an alternative order and alternative times relative to the travel order recommendation during which to visit the set of locations selected for the upcoming trip of the electric vehicle.

15. The non-transitory computer-readable medium of claim 9, further comprising program code to determine wait times associated with one or more charging stations located near the destination location based on historical information regarding the one or more charging stations located near the destination location.

16. The non-transitory computer-readable medium of claim 9, in which the program code to determine the start location and the destination location comprises:
   program code to display the map in response to a user request to perform the upcoming trip to the destination location; and
   program code to request personalized information from a user regarding frequently visited locations.

17. A system for an electric vehicle trip simulator, the system comprising:
   a trip parameters determination module to determine parameters for an upcoming trip of an electric vehicle, including at least a start location and a destination location;
   a trip data analysis module to analyze data associated with a plurality of points of interest between the start location and the destination location;
   a location set selection module to select a set of locations from the plurality of points of interest for the upcoming trip of the electric vehicle, according to the analyzing of the data and user-specific historical information;
   a travel order display module to display a travel order recommendation associated with the set of locations selected for the upcoming trip of the electric vehicle on a map, and to concurrently display an itinerary to perform the travel order recommendation adjacent to the map, including each selected location, a distance to reach a next selected location, an indication of whether a charging station is proximate each selected location, and a selected charging station location for the upcoming trip including a rationale for the selected charging station location according to a current charge capacity of the electric vehicle; and
   a controller to control the electric vehicle according to the itinerary to reach the destination location.

18. The system of claim 17, in which the travel order display module is further to display a preferred order and times during which to visit the set of locations selected for the upcoming trip of the electric vehicle.

19. The system of claim 17, in which the travel order display module is further to display an alternative order and alternative times relative to the travel order recommendation during which to visit the set of locations selected for the upcoming trip of the electric vehicle.

20. The system of claim 17, in which the trip data analysis module is further to determine wait times associated with one or more charging stations located near the destination location based on historical information regarding the one or more charging stations located near the destination location.

* * * * *